United States Patent
Murali et al.

(10) Patent No.: US 8,259,786 B2
(45) Date of Patent: Sep. 4, 2012

(54) CHANNEL ESTIMATION FILTER FOR OFDM RECEIVER

(75) Inventors: Partha Sarathy Murali, San Jose, CA (US); Kashiviswanath Nethi, Medak (IN); Karthik Vaidyanathan, San Jose, CA (US); Sundaram Vanka, Notre Dame, IN (US)

(73) Assignee: Redpine Signals, Inc., San Jose, CA (US)

( * ) Notice: Subject to any disclaimer, the term of this patent is extended or adjusted under 35 U.S.C. 154(b) by 778 days.

(21) Appl. No.: 12/368,431

(22) Filed: Feb. 10, 2009

(65) Prior Publication Data

US 2010/0202504 A1 Aug. 12, 2010

(51) Int. Cl.
*H03H 7/30* (2006.01)
(52) U.S. Cl. .................................................. 375/232
(58) Field of Classification Search .................. 375/232, 375/229, 353, 355
See application file for complete search history.

(56) References Cited

U.S. PATENT DOCUMENTS

| 6,788,738 B1* | 9/2004 | New .............................. 375/229 |
| 2004/0170223 A1* | 9/2004 | Chiueh et al. ................. 375/229 |
| 2010/0158178 A1* | 6/2010 | Sobchak et al. .............. 375/355 |

* cited by examiner

*Primary Examiner* — Leon-Viet Nguyen
(74) *Attorney, Agent, or Firm* — File-EE-Patents.com; Jay A. Chesavage

(57) ABSTRACT

A channel smoothing filter with a finite impulse response (FIR) has a controller which reads parallel sample data out of an FFT memory in such a manner as to generate an even function, the sample data applied to a preamble equalizer accompanied by a preamble sign and zero, the preamble outputs coupled to three filter processors, each filter processor having four filter engines whose outputs are summed, the channel smoothing filter generating an a register output, the register input coupled to a summer which has as inputs: the first filter processor shifted by four, the second filter processor shifted by two, the third filter processor, and the register output. Coefficients for an edge filter and a central filter are provided in Zero Sign Shift (ZSS) format, and by selection of coefficients using a canonical signed digit (CSD) algorithm, no multipliers are required for the channel smoothing FIR filter.

17 Claims, 18 Drawing Sheets

SISO single stream
Transmitter/Receiver Link

MIMO 2x3 two-stream
Transmitter/Receiver Link
Prior Art

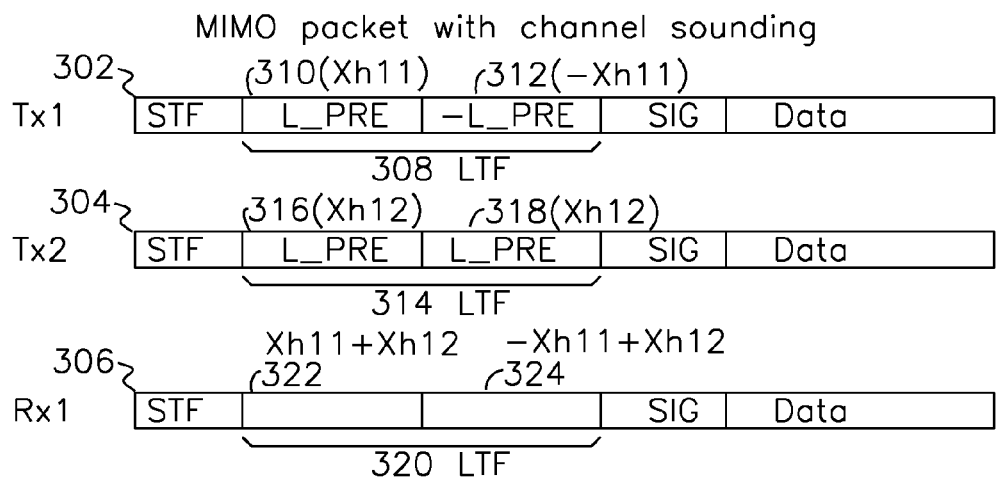
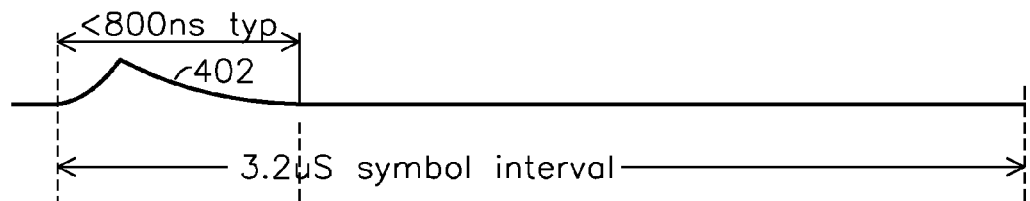

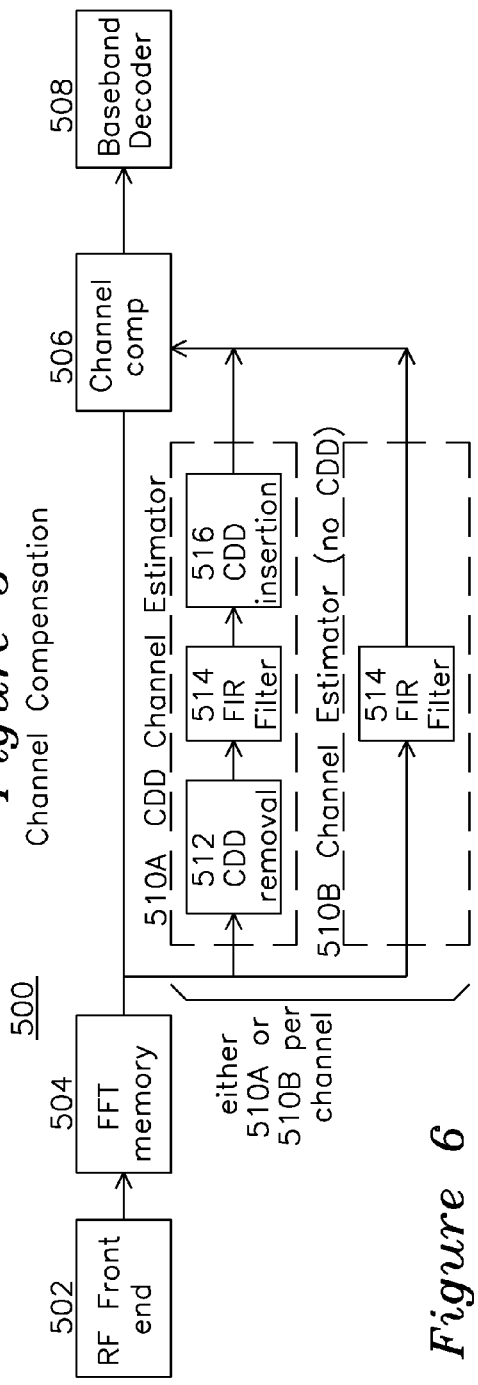
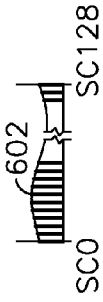
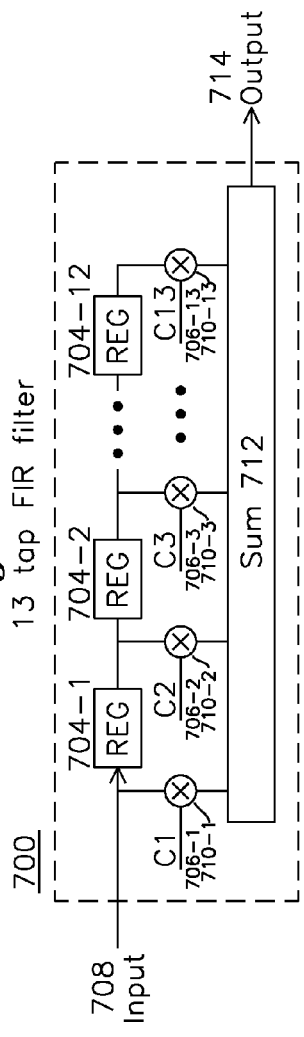

2x3 MIMO Rx Channel Smoothing

Generation of h from FFT memory

Channel Smoothing Filter

Xh(i) to h(i) Preamble Equalizer

Filter engine example non-centered channel impulse response
(ref FFT input)

centered channel impulse response
(shift FFT input 8 samples)

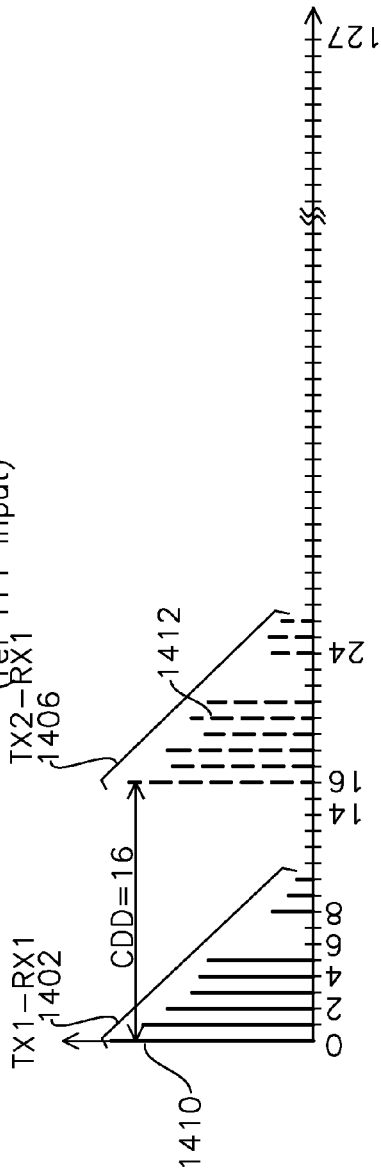
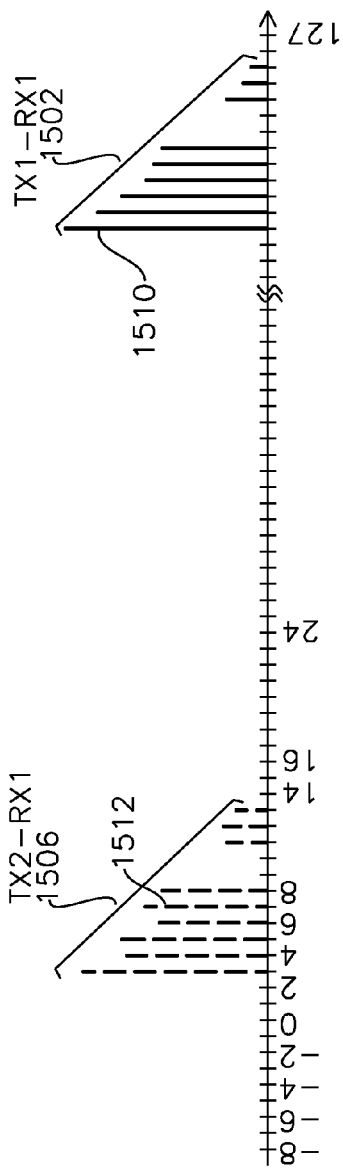
Figure 14 — non-centered channel impulse reponse (ref FFT input)
Figure 15 — centered CDD channel after shifting FFT input Channel Smoothing filter impulse response
- 1702 (800ns)
- 1704 (400ns)

Edge filter impulse response 1802 end coeff
1804 start coeff

Example Calculation of h8

Example Calculation of smoothed h9

CHANNEL ESTIMATION FILTER FOR OFDM RECEIVER

FIELD OF THE INVENTION

The present invention relates to a filter for use in channel smoothing over a range of discrete frequencies expressed as subcarriers. In particular, the invention relates to an apparatus and method for equalizing sub-carriers spanning a communications channel in an orthogonal frequency division multiplexing (OFDM) receiver.

BACKGROUND OF THE INVENTION

In an OFDM receiver, channel smoothing is performed on the estimated channel in order to reduce the effects of noise on the estimated channel, thereby improving the system packet error performance. FIG. 1 shows a single stream OFDM transmitter 102 accepting an input stream s1 104 to a baseband encoder 106 which encoded stream is provided to an inverse fast Fourier transform (IFFT) 108 to produce a plurality of baseband subcarriers such as 1 through 1024 or 1 through 512, and the subcarriers are modulated to a carrier frequency for coupling to an antenna 112 as transmitted signal X. The transmitted signal X is coupled through a channel with a frequency dependent characteristic H to receive antenna 132 of receiver 130 to form received signal Y=HX. The receiver 130 receives signal Y, which is baseband converted using RF Front End 133 and applied to FFT 134 to channel compensator 138 and to decoder 140 which generates the received stream S1'. Channel estimator 136 estimates the channel characteristic H during a long preamble interval, and the channel characteristic H is applied to channel compensator 138.

FIG. 2 shows a Multiple Input Multiple Output (MIMO) receiver 240 operative on two transmit streams s1 and s2 204 encoded 206 and provided to first stream IFFT 208 which generates baseband subcarriers, which are provided to RF modulator and amplifier 210 and coupled as X1 to antenna 216. Second stream IFFT 212 and RF modulator and amplifier 214 similarly generate subcarriers which are upconverted and coupled to antenna 218 as X2. Receiver 240 has three antennas 242, 244, 246, which couple to receivers 248, 250, 252 and to output decoder 254 which forms decoded streams s1' and s2'. Each receiver 248, 250, 252 performs the receive functions as described for FIG. 1, however the channel estimation function 249, 251, 253 for each receiver uses the long preamble part of the packet to characterize the channel from each transmit antenna 216, 218 to each receive antenna 242, 244, 246. For example, receiver 248 must characterize and compensate the channel h11 from 216 to 242 as well as channel h12 from 218 to 242. Each channel characteristic h11 and h22 is a linear array containing real and imaginary components for each subcarrier, typically 1 through 1024. The channel estimator 249 therefore contains h11 and h12, estimator 251 contains h21 and h22, and channel estimator 253 contains h31 and h32. The 2×3 MIMO case of FIG. 2 shows the case where the number of remote transmitters Nt=2 and the number of local antennas and receivers Nr=3. For a MIMO receiver where the number of remote transmitters is Nt and the number of local antennas and receivers is Nr, the Nt*Nr channels have a frequency response which may be smoothed over a range of subcarrier frequencies using a finite impulse response (FIR) filter for I and Q channels. Such a channel smoothing filter would require a total of 2*Nt*Nr filters. For a 13 tap FIR filter, each tap would have an associated multiplier, so such an implementation would require 13 complex multipliers for each filter, or 26*Nt*Nr multipliers total at each receiver station.

It is desired to reduce the complexity of required filtering for a MIMO OFDM channel equalization system. It is also desired to form a channel smoothing filter which does not require multipliers. It is also desired to provide a channel smoothing filter which operates by iterating over all of the FFT receive channels.

OBJECTS OF THE INVENTION

A first object of the invention is a channel smoothing filter operative on a plurality of subcarriers which utilizes only shift and add operations.

A second object of the invention is a channel smoothing filter operative on a plurality of subcarriers accepting pre-computed channel coefficients which depend on a windowing function derived from a channel response time.

A third object of the invention is a channel smoothing filter having a preamble equalizer part and a filter part, the equalizer part which generates a plurality of equalized H values from X*H values by providing a zero and preamble sign value to either zero or invert the parallel values from the sum and difference of FFT memory for each subcarrier, the output of each preamble equalizer part coupled to a first filter processor, a second filter processor, and a third filter processor, the first filter processor output applied to a first shifter which left shifts the first processor output four times, the second filter processor output provided to a second shifter for shifting the output of the second filter processor two times, the third filter processor output coupled to a summer which also accepts the output of the first shifter and second shifter, the summer having an output coupled to a register having an output also coupled to the summer, each filter processor having a plurality of filter engines with outputs summed to generate the filter processor output, each filter engine coupled to one of the preamble equalizers, each filter engine also accepting a ZSS coefficient, the ZSS coefficient containing a zero bit, a sign bit, and one or more shift bits, the ZSS coefficient causing the output of the associated filter engine to be zero when the ZSS zero bit is asserted, positive or negative according to the ZSS sign bit, and shifted according to the value of the ZSS shift bits.

A fourth object of the invention is the identification of a channel response time followed by application of filter coefficients which result in a wider filter frequency response when a channel response time is shorter.

SUMMARY OF THE INVENTION

For each receive channel of a SIMO/MIMO receiver, a channel characteristic from a long preamble time is stored into an FFT memory. The FFT memory contains additive and subtractive responses for each combination of transmitters for a particular receiver, which responses are extracted into a particular channel, compensated for an associated preamble sign and zero, and applied to a filter. Optionally, the channel characteristic is shifted to the mid-point of the range of samples having signal energy such that a filter with only a real channel, rather than a filter with both real and imaginary channels, is required. In one embodiment, the channel samples are accompanied by a preamble sign and preamble zero which are applied to a preamble equalizer, also known as an H_equalizer. The H_equalizer accepts an FFT memory for a particular sample, and generates an output with is the original input if the preamble sign is asserted and the preamble zero is not asserted, or generates an output which is the 2's compliment of the input if the preamble sign is not asserted and the preamble zero is not asserted, or generates a zero output is preamble zero is asserted. The output of each H_equalizer stage is provided to a channel smoothing filter accompanied by a ZSS coefficient derived from an FIR filter coefficient, which ZSS coefficient contains a shift part, a sign part, and a zero part. In one embodiment, the channel filter has three sets of filter processors, each of the three filter processors accepting four H sample values such as h11(i+0) through h11(i+3), and each of the filter processors have four unique ZSS coefficients applied. Each filter processor has four filter engines coupled to each of h11(i+0) through h11(i+3) and a unique ZSS coefficient, where the filter engine outputs are summed to form a filter processor output. Each filter engine of a filter processor accepts the particular h input and applies the operation of the ZSS coefficient, which results in an output which is shifted left 0 to three times according to a shift part of the ZSS, optionally 2's complimented according to a sign part of the ZSS, or zeroed according to a zero part of the ZSS. The output of each filter processor is formed by summing the four filter engine outputs, although typically only one filter engine of a particular filter processor has a non-zero ZSS and is therefore active in contributing to the summed output. The output of the channel smoothing filter is formed by a register which has an input formed from summing:

1) the left-shifted by four output of the first filter processor;
2) the left-shifted by two output of the second filter processor;
3) the output of the third filter processor;
4) the previous value of the summer, stored in a register.

On each system clock cycle, a new set of four FFT memory outputs is output to the preamble equalizer, also causing a new set of filter processor inputs and ZSS coefficients to be applied to the new preamble equalizer output, resulting in a new summer output which is applied to the input of the register.

The ZSS coefficients which are applied to the inputs of the filter processors are pre-selected such that only one filter engine within a filter processor is active at a particular time. To synthesize a 13 tap FIR filter, each register clock cycle, a successive set of four H values are presented such that after 3 register clock cycles, a first smoothed H value may be coupled and presented, with one new H value generated on each subsequent clock. A set of edge filter ZSS coefficients are used at the beginning and end of the series of samples, and smoothing filter coefficients are used at other times. Additionally, the ZSS coefficients for the edge filter and smoothing filters may depend on the length of the time-domain response, such that a shorter time-domain response during channel sounding results in a narrower time-domain (and wider frequency domain) filter, thereby improving the noise performance of the system by excluding noise outside the time domain response window of the system.

Additionally, the FFT inputs are pre-processed and offset in time to the FFT input midspan, thereby forming a real function which requires only a real FIR filter channel, rather than the complex (real and imaginary) FIR filter channel and associated coefficients. The FFT processor identifies a central FFT input sample from the range of FFT input memory samples containing energy and offsets the impulse channel response to center it about the central sample by shifting the training symbol at the input of the FFT to center the channel impulse response, resulting in 50% hardware efficient in memory and computational complexity in using even and real filter. Additionally, the filter coefficients are encoded and stored in the coefficient RAM such that only 7 of the 13 coefficients stored are non-zero, reducing the coefficient memory requirement.

BRIEF DESCRIPTION OF THE DRAWINGS

FIG. 3 shows the time diagram for a first transmitter packet, a second transmitter packet, and a received superposition packet.

FIG. 4A shows the time domain response to a channel characterization having a multi-path channel, and FIG. 4B shows the related time-domain windowing filter for a multi-path channel.

FIG. 4C shows the time domain response for a channel characterization having less multi-path response than FIG. 4A, and FIG. 4D shows the related windowing filter for the reduced multi-path response filter.

FIG. 4E shows the noise removal effect of a multi-path window function.

FIG. 4F shows the noise removal effect of a reduced multi-path window function.

FIG. 5 shows the block diagram for a channel compensator and channel estimator.

FIG. 6 shows the plot of a smoothing function applied in the sample time domain to the subcarriers of a channel in the frequency domain.

FIG. 7 shows the block diagram for a 13 tap FIR filter.

FIG. 14 shows a time domain response plot for two transmitter channels at the input of an FFT.

FIG. 15 shows a time domain response plot for two transmitters shifted channels at the input of an FFT.

DETAILED DESCRIPTION OF THE INVENTION

Figure 1:
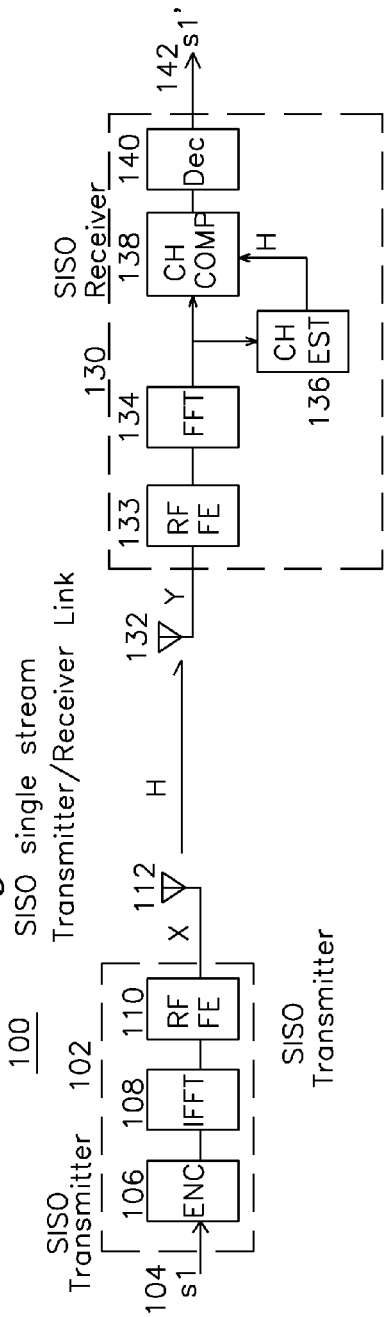
FIG. 1 shows a block diagram for a transmitter coupled to a SISO receiver through a communications channel having a channel response H.

Packet based communication systems such as OFDM WLAN use the training symbols of the preamble, which are sent at the beginning of the packet by a transmitter of the MIMO system, to allow estimation of the channel frequency response at the receiver of the MIMO system. Channel estimation can be performed in the frequency domain using the training symbol output from the FFT as follows:

$$Y_k = H_k X_k + N_k$$

where:
 k is the sub-carrier index
 $Y_k$ is the signal output from the FFT
 $H_k$ is the channel frequency response coefficient
 $X_k$ is the training tone with unit amplitude
 $N_k$ is the noise in the channel
 $H$ can be estimated at the receiver with the training symbol as follows:
 1) Equalize the Y received training symbols with the known unit amplitude training symbol $X_t$:

$$Y_{eq} = Y^* X_t => HX^* X_t + N^* X_t$$

$$Y_{eq} = H + N^* Xt \; \{X^* X_t = 1\}$$

2) Apply the resulting filter $\{Yeq\}$ on $Y_{eq}$ to remove noise, which results in:

$$H_{est} = \text{filter}\{Y_{eq}\} => H + \{N^* X_t\}_{colored\_noise}$$

FIG. 3 shows a packet 302 from a first transmitter and simultaneously-sent packet 304 from a second transmitter of a MIMO system. The first transmitter packet 302 includes a long preamble 308 which includes a first long preamble part 310 and a second long preamble part 312 which is inverted compared to the first preamble part. The second transmitter packet 304 also includes a long preamble 314 which includes a first long preamble part 316 and a second long preamble part 318. In this manner, the OFDM symbols which combine at the receiver packet 306 provide X*h11+X*h12 322 during the first preamble part and −X*h11+X*h12 324 during the second preamble part. This provides that X*h11 may be formed by subtracting the received second preamble part 322 from the first preamble part 324, and X*h12 may be formed by adding the first preamble part 322 to the second preamble part 324.

Assuming the channel impulse response H is time limited, the time domain window will be flat over the time span of the channel impulse response, so that the impulse response can be captured without any distortion by the windowing time domain. Since the impulse response duration varies with the channel and is not known, the worst case duration (500 ns, or 16 samples in IEEE802.11n channels) is shown in FIG. 4A, which should be considered when choosing the window duration, since windowing in the time domain is equivalent to performing convolution in the frequency domain.

FIG. 4A shows the time domain response 402 in a multi-path environment, where the receive signal includes reflections from various surfaces. A typical channel response during a 3.2 us symbol interval is less than 800 ns. Although the present diagrams show time-domain waveforms for clarity, windowing function W1(t) 404 of FIG. 4B may be applied in the post-FFT frequency domain to exclude noise beyond the 800 ns channel response time. FIG. 4C shows the same channel sounding time domain response 406 in the absence of multi-path reflection, and FIG. 4D shows a suitable windowing function W2(t) 408 which recognizes the shorter time domain channel response. FIG. 4E shows signal S1(t) 402 with window function W1(t) 404 which excludes noise in region 412 to improve receiver sensitivity. W1(t) would be applied as a Fourier transform in the frequency filtering characteristic of the subcarriers applied to the channel smoothing filter. FIG. 4F similarly shows the improved noise reduction available for the minimal multipath case using the Fourier transform of W2(t) to perform frequency filtering, thereby excluding more channel noise than W1(t) of FIG. 4E.

FIG. 5 shows one embodiment of a channel compensation filter 500 which has a channel estimator 510A used when Cyclic Delay Diversity (CDD) is present in the channel, and a channel estimator 510B when CDD is not present. RF front end 502 generates preamble responses X*H which are placed in FFT memory 504. Channel compensation 506 increases some subcarrier levels by a multiplicative value and reduces others according to channel estimator 510. Baseband decoder 508 operates on the channel equalized subcarrier values. CDD Channel estimator 510A also includes the function of removing CDD using CDD removal 512, and re-inserts the CDD 516 at the original levels, and FIR filter 514 operates across the subcarriers to provide per-subcarrier channel compensation values used by 506. When CDD is not present, channel estimator 510B operates using identical FIR filter, but without the CDD removal 512 or insertion 516.

FIG. 6 shows an example channel smoothing characteristic 602 applied to FFT input sample 0 through sample 128 of an OFDM system.

FIG. 7 shows a typical prior art 13 tap FIR filter, where an input 708 is applied to a series of registers 704-1 through 704-12, the output of each multiplied 710-1 through 710-13 by coefficient C1 706-1 through C13 706-13, and summed 712 to form output 714.

Figure 8:
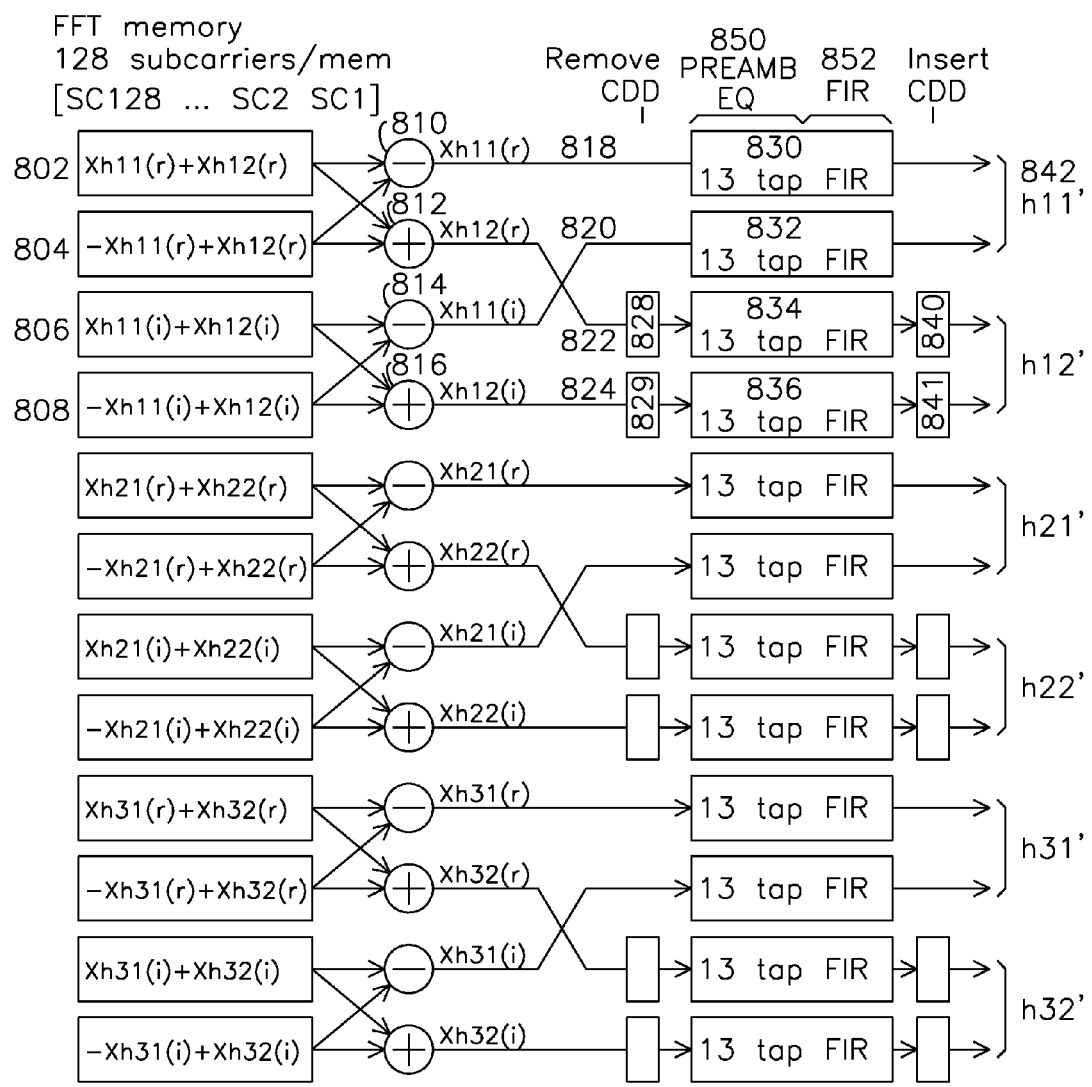
FIG. 8 shows the block diagram for a smoothing filter.

FIG. 8 shows FFT memory 802 containing previously described first preamble part X*h11(r)+X*h12(r), FFT memory 804 containing second previously described preamble part −X*h11(r)+X*h12(r), FFT memory 806 containing first preamble part X*h11(i)+X*h12(i) and FFT memory 808 containing second preamble part −X*h11(i)+X*h12(i) such as from the imaginary channel of a second receiver. Subtractor 810 forms the real component h11(r) and subtractor 814 forms the imaginary component h11(i), which are sent to FIR filter 830 and 832, respectively, operating on the real and imaginary channels to generate h11' 842. The other channels similarly operate, and the FFT memory outputs the subcarriers of the channel response in succession for FIR filtering, as shown. Channels h11, h21, h22 do not include CDD removal and insertion, such as is shown for channel h12 real and imaginary CDD insertion 828, 829, respectively, and h12 real and imaginary CDD removal 840, 841, respectively.

Figure 9:
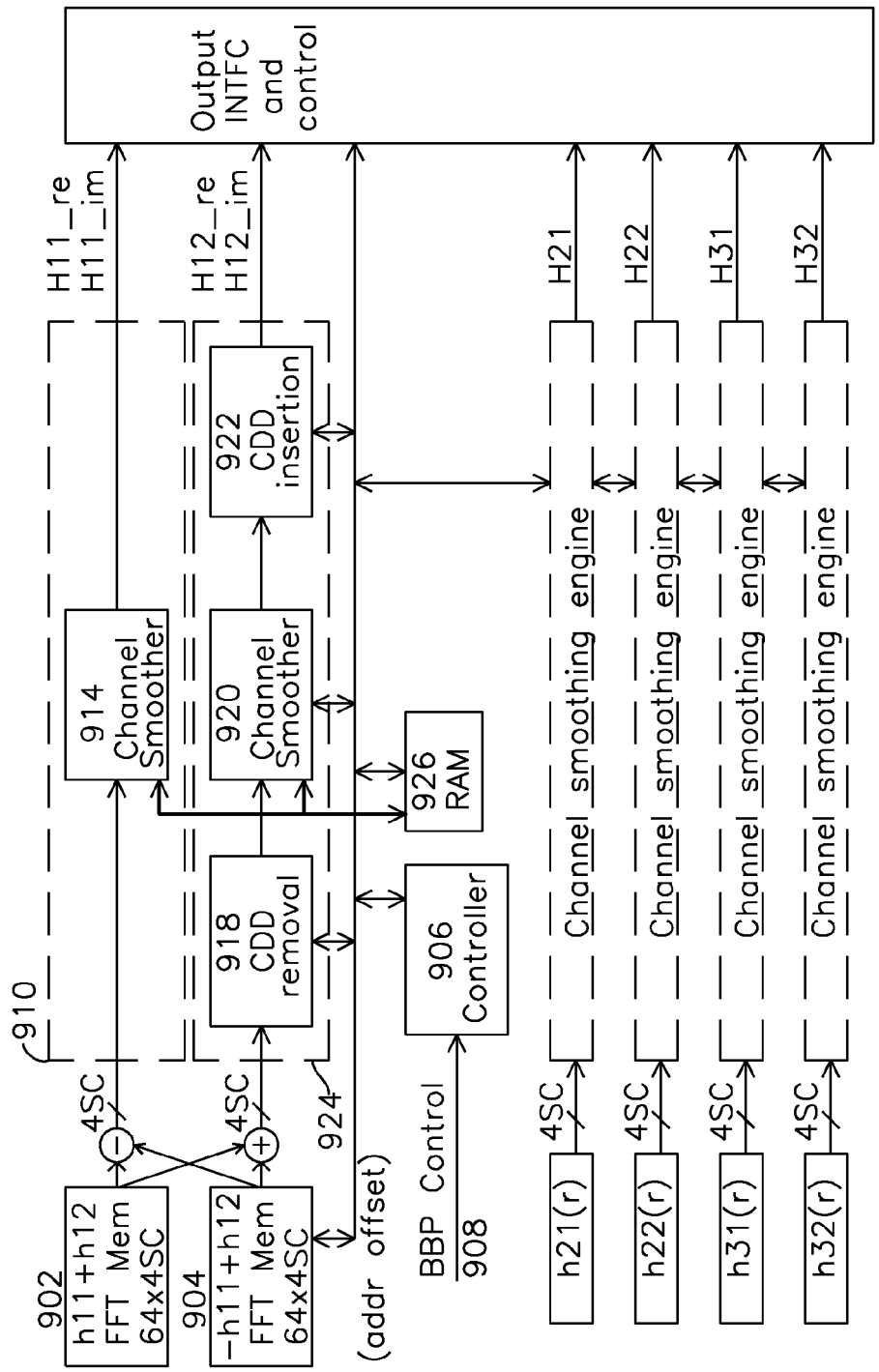
FIG. 9 shows a block diagram for a channel smoothing filter for a 2×3 MIMO system.

FIG. 9 shows an embodiment of a channel smoothing filter, where the FFT memory is operative using controller 906 to generate an offset in the addressing of subcarriers from memory 902 containing h11+h12 and memory 904 containing −h11+h12, which offset in addressing causes the input to the filter 914 to be an even function, resulting in the elimination of the need for an imaginary compensation channel, such that channel smoothing engines 910, 924, etc only require a single filter channel operative on the data stream created by the even input function. As was described earlier, H11 channel 910 does not require CDD removal and insertion, which is present in H12 channel 924 as CDD removal 918 and CDD insertion 922.

Figure 10:
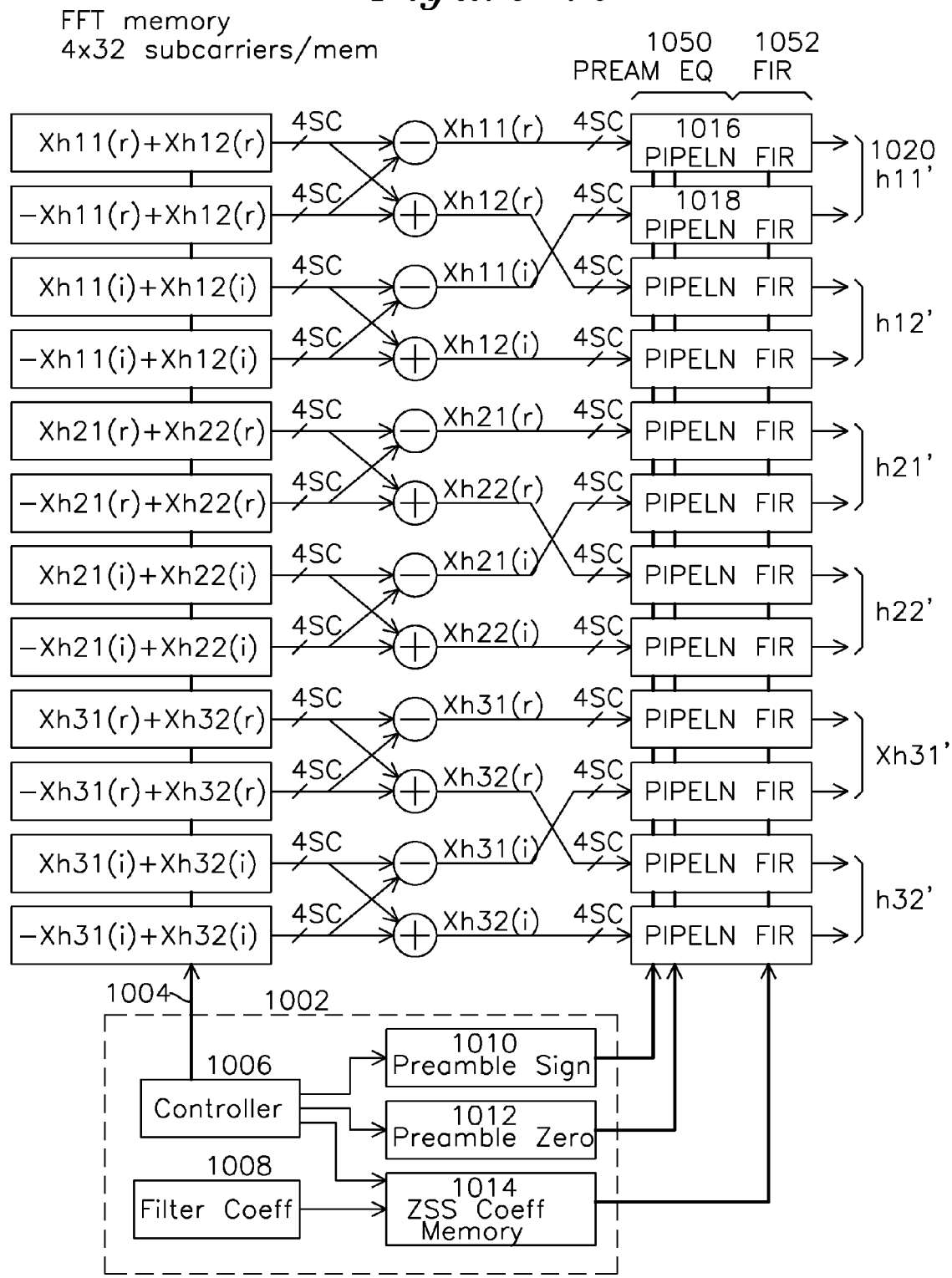
FIG. 10 shows a block diagram for a channel smoothing filter for a 2×3 MIMO system.

FIG. 10 shows an embodiment of a smoothing channel controller 1002 which generates a memory control output 1004 which may be used to create an even function by off-setting the output of the FFT memories to accomplish the creation of a single real channel filtering requirement, as described earlier. The controller 1006 also controls the outputs applied to a preamble equalizer (H_Eq) part of pipeline filter 1016, generating a preamble sign 1010 which indicates the sign of a particular preamble subcarrier, and a preamble zero 1012, which generates an output that indicates that a particular preamble subcarrier is not to be used in the filtering operation, such as for truncation of input data. ZSS coefficient generator 1014 generates filter coefficients converted from canonical signed digit (CSD) form into the ZSS form {zero, sign, shift[1 . . . 0]}, as will be described later. Each pipeline filter such as 1016 has a first preamble equalizer part 1050 which accepts a preamble sign from 1010 and preamble zero from 1012, and a second filter part 1052 accepting ZSS coefficients from memory 1014.

Figure 11A:
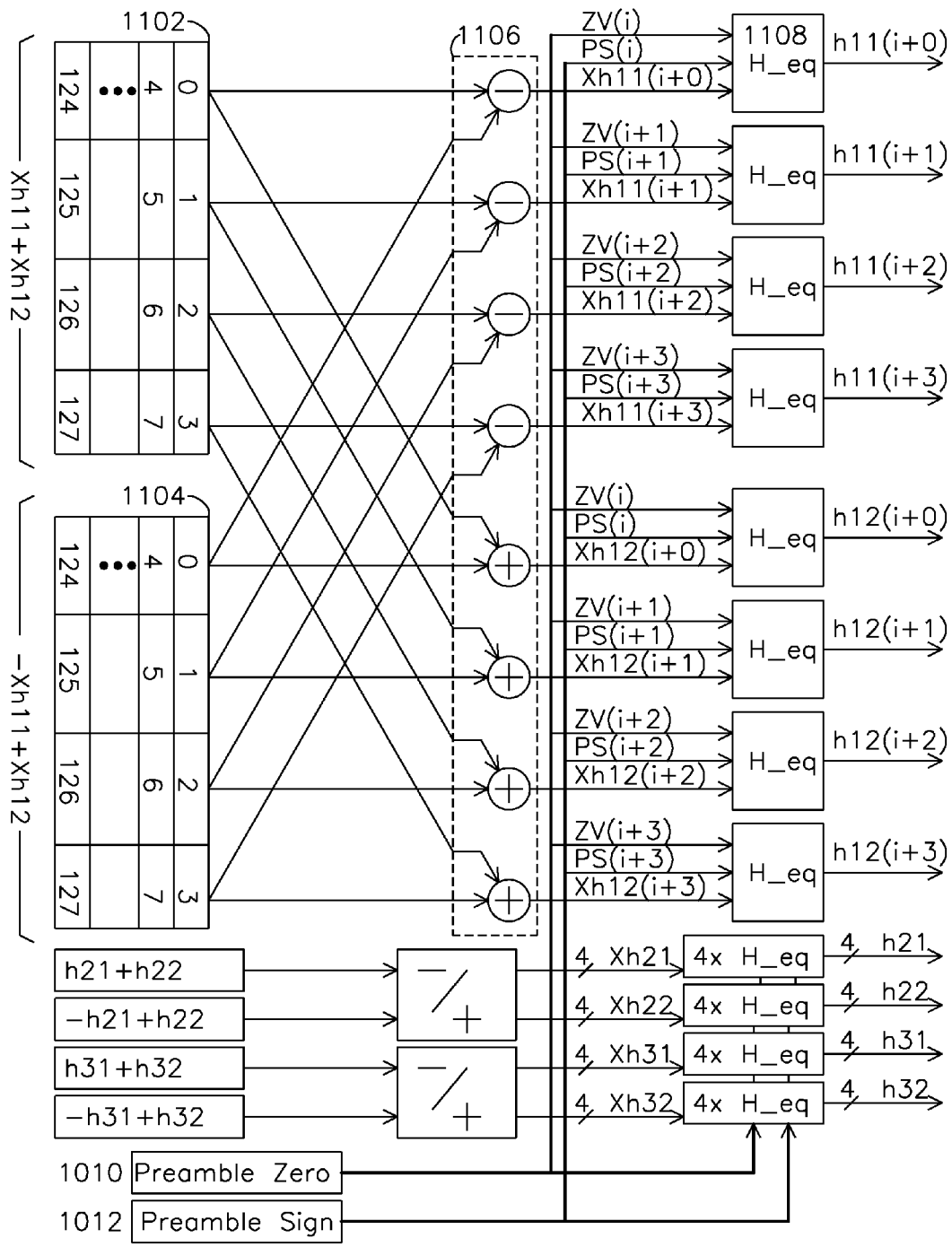
FIG. 11A shows a block diagram for a FFT memory coupled to a preamble equalizer and controller.

FIG. 11A shows one embodiment of the channel smoothing filter, where X*h11+X*h12 is stored in FFT memory 1102 and −X*h11+X*h12 is stored in FFT memory 1104. Each FFT memory outputs four such subcarrier values at a time, and subtractor/adder 1106 generates X*h11(i+0), X*h11(i+1), X*h11(i+2), X*h11(i+3) as before, which are provided to a preamble equalization stage H_eq 1108, which accepts preamble zero ZV(i) and preamble sign PS(i) for each input subcarrier in the group of four, thereby generating for each group of four raw preamble FFT outputs X*h, which are converted by the preamble equalizer to the four values h11(i+0), h11(i+1), h11(i+2), h11(i+3). One embodiment of the preamble equalization stage H_eq 1108 of FIG. 11A is shown in FIG. 11C. Each of the four equalizers operate in an identical manner, each with its own inputs and outputs. Examining one preamble equalizer, a subcarrier input 1152 is applied with preamble sign 1154 and preamble zero 1155, which generates a compensated preamble output 1162. The preamble zero ZV(i) 1155 is used with second multiplexer 1160 to zero the particular output, such as for data stream truncation, whereas first multiplexer 1158 selects either the original input X*h(i) or a 2's compliment generated by 1156, based upon preamble sign input 1154. In this manner, a compensated preamble subcarrier value 1162 is generated, with the controller such as 1106 of FIG. 10 providing zero 1155 and sign 1154 inputs for each particular subcarrier to be equalized. The equalized outputs of FIG. 11A are thereby provided in groups of four {h11(i+0), h11(i+1), h11(i+2), h11(i+3)} to the channel smoothing filter of FIG. 11B.

Figure 11B:
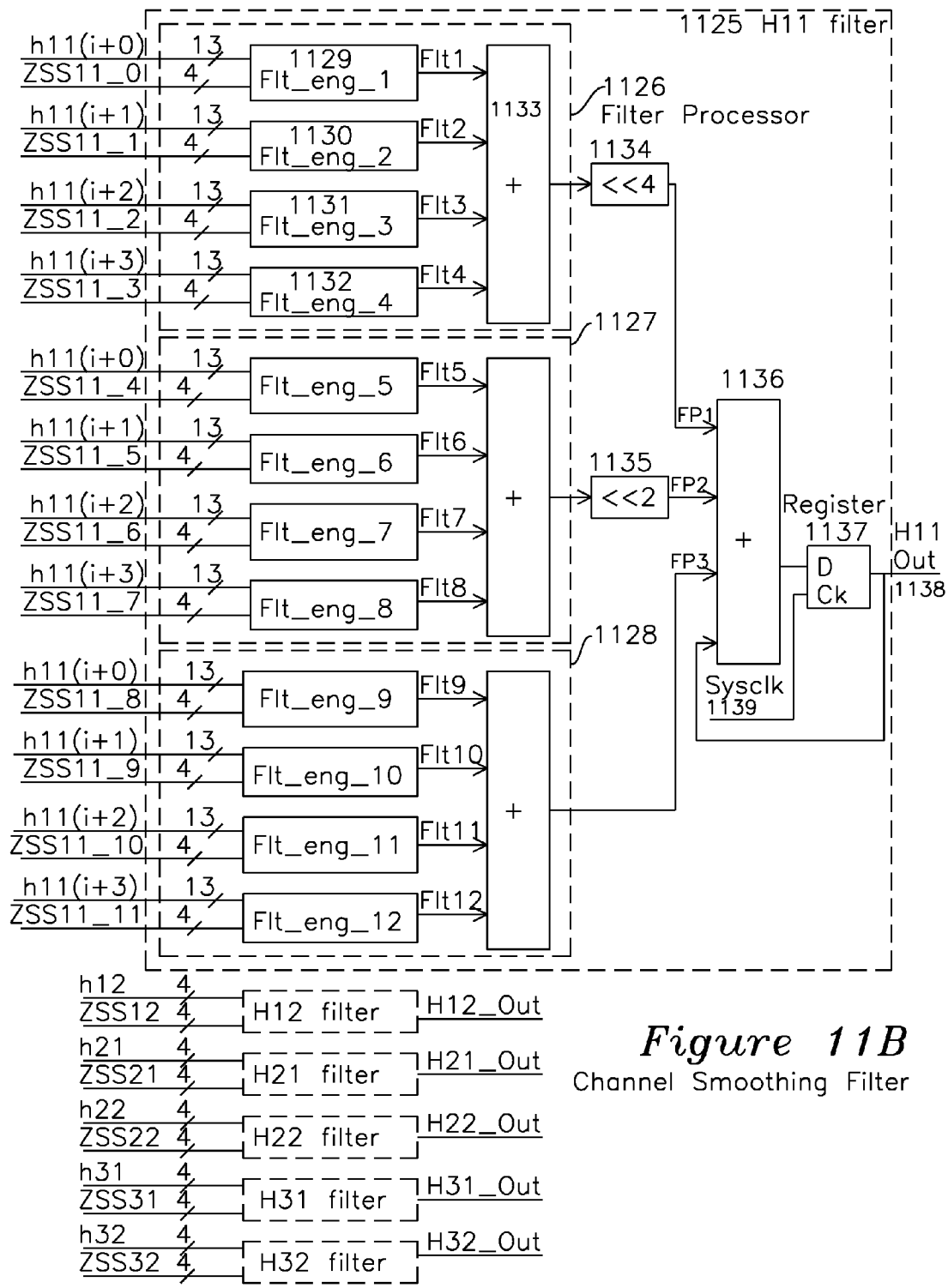
FIG. 11B show the block diagram of a channel smoothing filter.
Figure 11C:
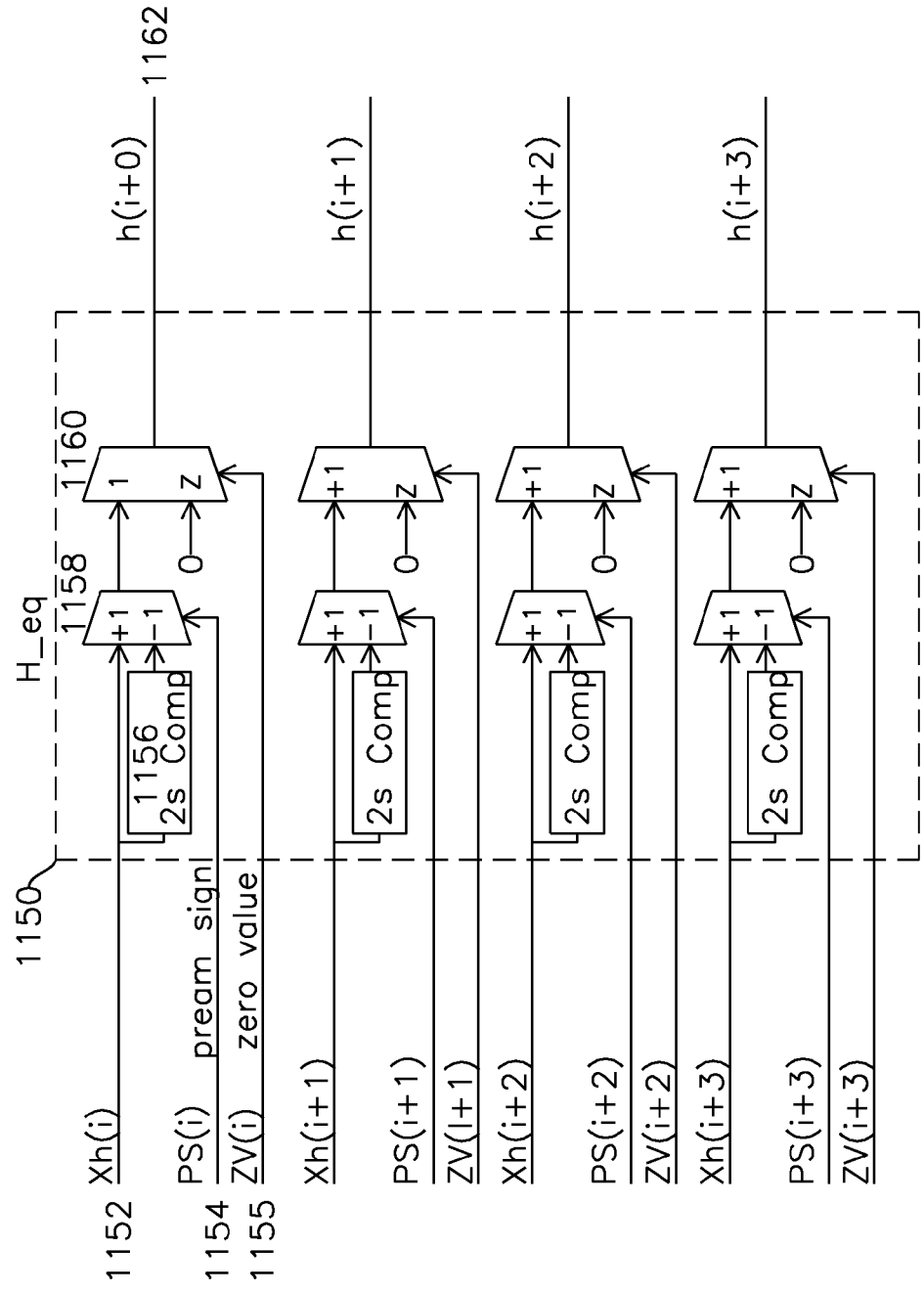
FIG. 11C shows the block diagram for the preamble equalizer (H_equalizer) of FIG. 11A.

FIG. 11B shows one embodiment of a channel smoothing filter 1125, shown in detail with three filter processors 1126, 1127, 1128, each of the three filter processors coupled to the four inputs h11(i+0), h11(i+1), h11(i+2), h11(i+3), each filter processor having a filter engine such as Flt_eng_1 1129, Flt_eng_2 1130, Flt_eng_3 1131, and Flt_eng_4 1132, and each filter engine of the filter processor coupled to a unique set of ZSS filter coefficients, shown as ZS11_0 ZS11_1, ZS11_2, ZS11_3. The outputs of the filter engines 1129, 1130, 1131, and 1132 are summed 1133, left shifted by four 1134, provided to a filter summer 1136, and clocked out by register 1137 operating at a system clock rate. Each filter engine such as 1129, 1130, 1131, 1132 receives a unique one of the four h inputs, such as h11(i+0), h11(i+1), h11(i+2), h11(i+3) and an associated coefficient ZSS11_0, ZSS11_1, ZSS11_2, ZSS11_3, as shown. The other filter processors 1127, 1128 operate on the same {h11(i+0), h11(i+1), h11(i+2), h11(i+3)}, but with unique ZSS coefficients.

Figure 11D:
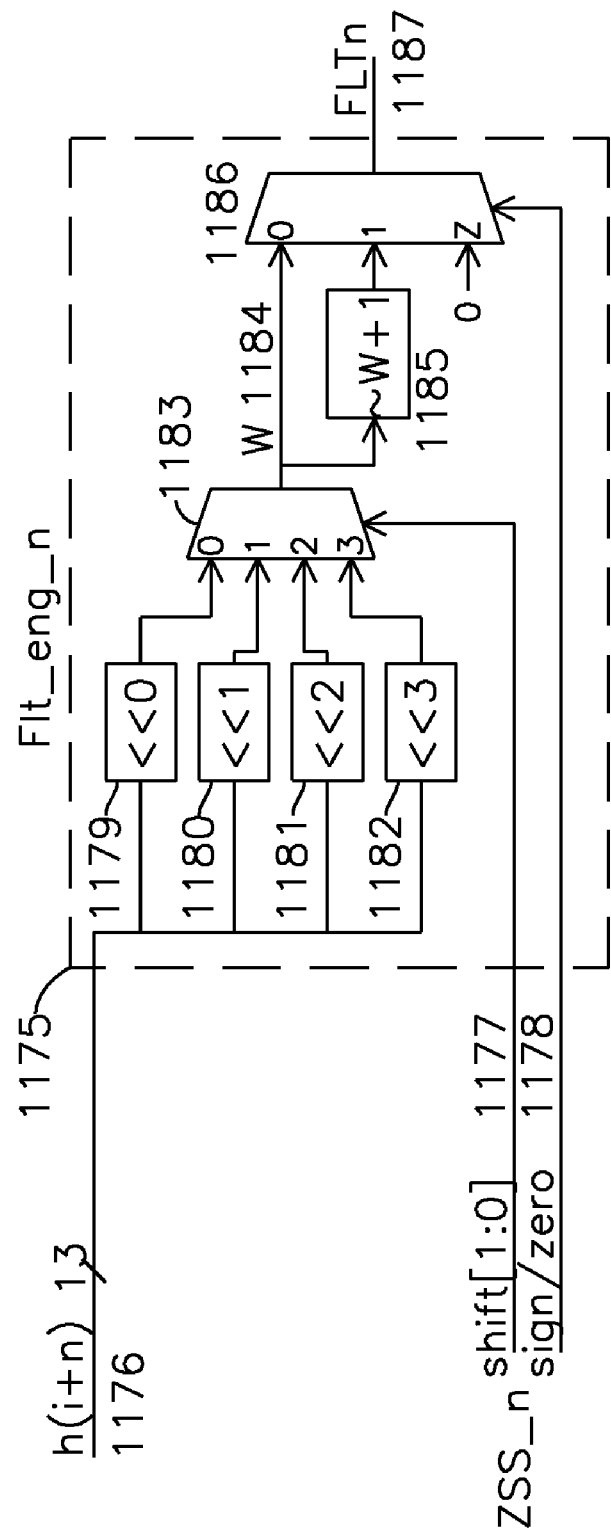
FIG. 11D shows the block diagram for the filter engine of FIG. 11B.

FIG. 11D shows an example embodiment of a filter engine 1175 such as 1129 of FIG. 11B, where the input 1176 such as h(i+0) (such as for 1129 of FIG. 11B) is left shifted zero times 1179, once 1180, twice 1181, or three times 1182 such as by simple bit re-mapping, and applied to a first multiplexer 1183 which selects one of the shifted inputs according to a shift input 1177 part of a ZSS coefficient. The ZSS coefficient XSS_n also includes a sign/zero part 1178, such as a ZSS coefficient produced by coefficient generator 1014 of FIG. 10. The output of the first multiplexer W 1184 is applied to second multiplexer 1186 along with a 2's complement (~W+1) formed by generator 1185. If the sign/zero input 1178 is Z (indicating zero), second multiplexer 1186 selects 0 to output FLTn 1187, and if non-zero, the sign bit of 1178 provides either the output W 1184 of first multiplexer 1183 to the output 1187, or selects the 2s compliment provided by 1185, which may be a binary inversion with one added to the result, using any method of 2s compliment known in the art.

Figure 12:
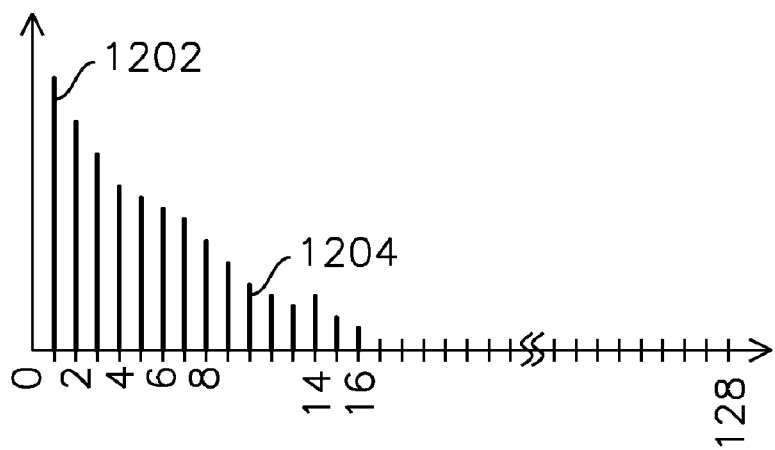
FIG. 12 shows a time domain plot for a single transmitter channel impulse response at the input of an FFT.
Figure 13:
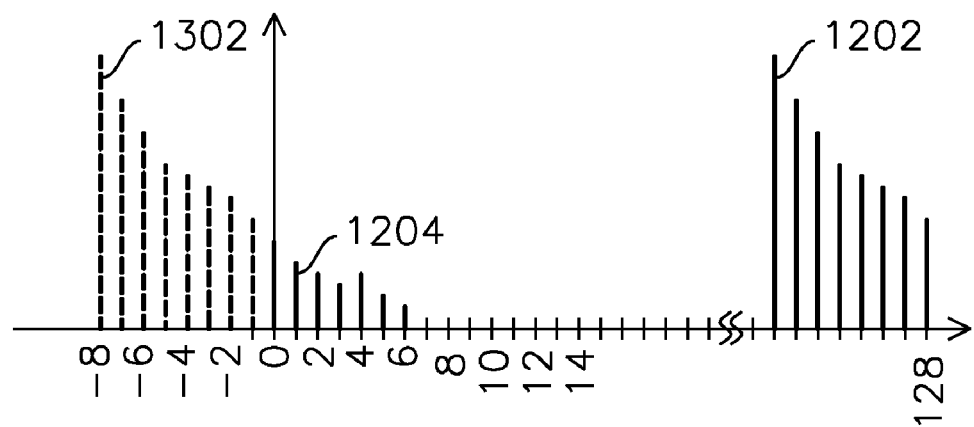
FIG. 13 shows a time domain response plot for a centered channel impulse response plot measured at the input of an FFT.

FIG. 12 shows a non-centered channel impulse response organized by FFT input sample 0 through sample 128, as may be commonly stored in FFT memory after a long preamble sequence, such as in the 802.11n SISO system shown in prior art FIG. 1, where each receiver chain estimates the channel impulse response spans over 0-15 corresponds to Tx1–Rx1. The preamble response may include first sample 1202 and tenth sample 1204. A filter which operates on the non-centered samples of FIG. 12 requires real and complex channel filtering, whereas the centered impulse response of FIG. 13 requires only a real channel filter, which reduces the filter complexity by ½. The centered FFT input for the training symbol of FIG. 13 is generated by left shifting the FFT input by half of the 16 samples which contain signal energy, or 8 samples, such that for a range of samples 0 to Nsc, of which the samples from 0 to Nsignal contain signal energy above a threshold, the FFT input memory outputs samples from Nsignal/2 to Nsc, followed by 0 through (Nsignal/2)−1, thereby resulting in a filter which requires only a real component, such as FIR filter 830 and others of FIG. 8, or FIR 1016 and others of FIG. 10. In one embodiment of the invention, the even-only (and real) FIR filter is designed with 13 taps to capture the worst case impulse response without any distortion.

FIG. 13 shows the result of centering the channel impulse response in a 128 point FFT system with an equal number of input samples Nsc=128 and the highest sample number containing energy being Nsignal=16, the centering achieved by offsetting the FFT input by Nsignal/2 or offsetting the FFT input by 8 samples, such that as applied to the filter, sample 10 1204 of FIG. 12 becomes Sample 1 1204 of FIG. 13 as shown and sample 1 1202 of FIG. 12 becomes sample 61 1202 of FIG. 13. Each shifted sample k then becomes sample (k−Nsignal/2), and samples with negative index are added to Nsc so that shifted samples are in the index range 0 to Nsc, thereby forming a circular buffer which provides an output which starts at Nsignal/2 and ends with the sample which precedes Nsignal/2. As described earlier, shifting the impulse response by Nsignal/2 to achieve centering prior to channel smoothing of the samples results in an even function which becomes real valued, eliminating the imaginary channel of the FIR smoothing filter. In the examples shown, Nsc represents the number of FFT input samples, which may be any number of samples, although Nsc of 64 or 128 are shown in the examples for understanding of the invention.

Figure 2:
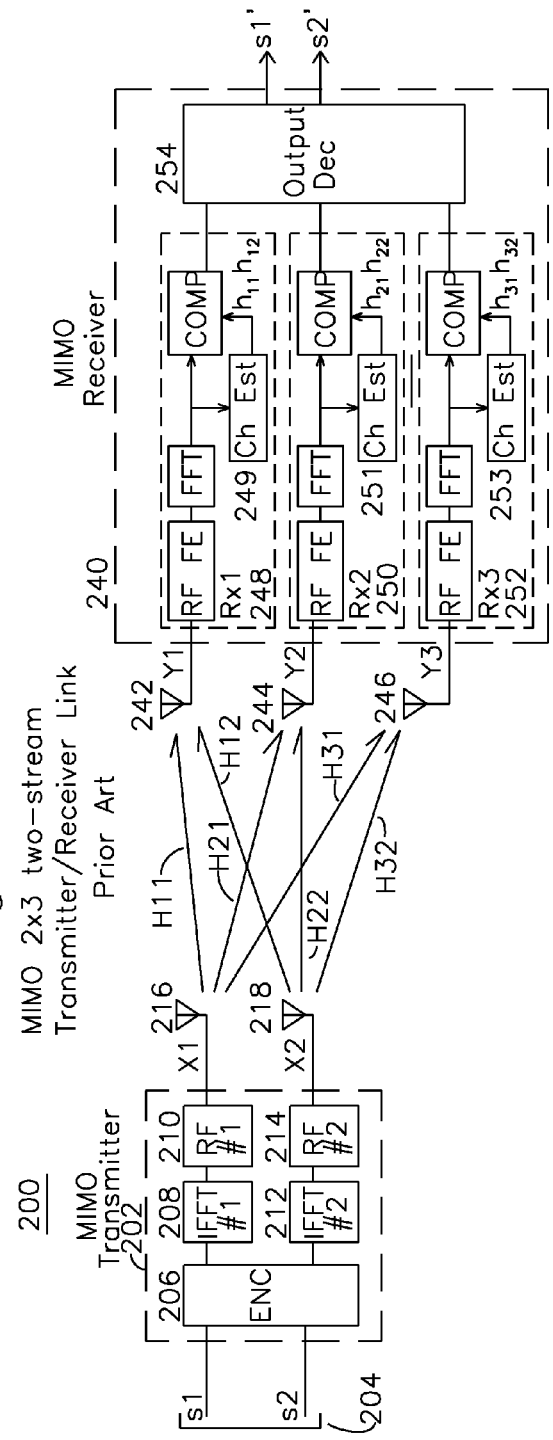
FIG. 2 shows a block diagram for a 2×3 MIMO system comprising a 2-antenna transmitter coupled through a communications channel to a 3-antenna receiver.

FIG. 14 shows the non-centered channel impulse response, such as that produced by the IEEE 802.11n MIMO system shown in FIG. 2 for Ntx=2 and Nrx=3, where each receiver chain estimates the two channels from Tx, and a Cyclic Delay Diversity (CDD) corresponding to 16 input samples is shown for the case of a 40 Mhz 128 point FFT, which could alternatively be 8 input sample delay for CDD in a 20 Mhz 64 point FFT of an IEEE 802.11n compliant system. Tx1–Rx1 channel impulse response 1402 is shown as spanning samples 0-10 whereas Tx2–Rx1 channel impulse response 1406 spans samples 16-26, with the delay of 16 samples from (Tx1-Rx1) to (Tx2-Rx1) related to CDD as described earlier. In a typical receiver, the Tx1-Rx1 samples 1402 and Tx2-Rx1 samples 1406 overlap and are therefore superimposed in the channel response, but for clarity of the present illustration and example, the TX1-RX1 samples 1402 are shown in solid lines and TX2-RX1 samples 1406 are shown with dashed lines and occupying unique time domain ranges. FIG. 15 shows the centered channel response after shifting the FFT input by half of the span of 26 samples containing signal energy above a threshold for the example shown in FIG. 14, resulting in a shift of 13 samples to form an even function which requires no imaginary FIR channel, as was described earlier. In this 2×3 MIMO system, the second transmitter Tx2 applies cyclic delay diversity (CDD) of 16 samples over the transmitted signal. CDD shifts the signal in time domain as described previously. Sample 1410 of FIG. 14 is shifted left 13 samples and becomes samples 1510 in FIG. 15, and samples 1412 of FIG. 14 are shifted to become samples 1512 of FIG. 15. Such shifting may be realized by reading out the FFT memory with an offset m in addressing, where m is the highest signal energy carrying sample number above sample 0 divided by 2. FIG. 14 shows 26 energy carrying samples, so m=13. Samples S are remapped to become S' according to S'=S−m, and samples less than 0 wrap to Nsc+m, where Nsc is the number of samples (typically the number of subcarriers) in the system, typically either 64 or 128. In the present example, sample 0 1402 is shifted left 13, mapping to sample 115, and sample 20 1412 is shifted left to 13 to become sample 6 1512. After shifting in this manner, the same FIR filter is applied in the CDD path to capture the channel at the center, and CDD is re-inserted after filtering, as was shown in FIG. 9 blocks 912 and 916 for the H11 channel smoothing engine 910. The IEEE802.11n standard describes sending the training symbols such that the normal channel and CDD channel can be separated by adding and subtracting the first and second training symbols, as was described in FIG. 3 and accomplished with add/subtract 1106. After decomposing the combined channel to normal channel and CDD channel, CDD removal block 912 of FIG. 9 may perform the channel centering operation shown in FIG. 15.

Figure 16:
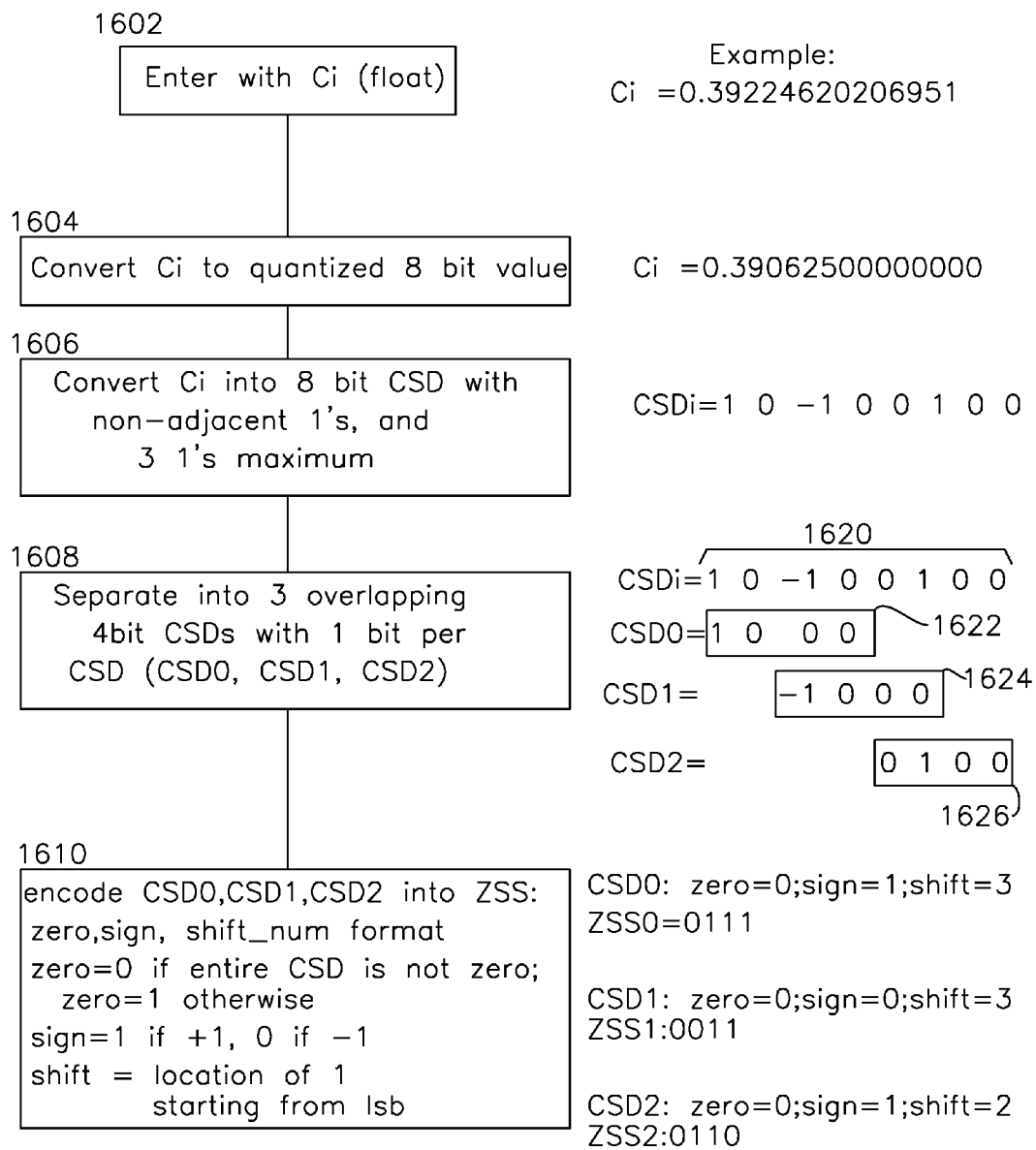
FIG. 16 shows the generation of a ZSS (zero/sign/shift) filter coefficient from a decimal filter coefficient.

FIG. 16 shows the generation of a filtering coefficient in the form ZSS for use with the filter of FIGS. 11A, 11B, 11C, and 11D. A floating point value Ci 1602 is the starting point, shown in a particular example as 0.39224620206951. In step 1604, this value is converted to a quantized 8 bit value, which for the present example is 0.390625. In step 1606, the value is converted to a canonical signed digit (CSD), where each bit of the number is +1, 0, or −1. Because of the non-uniqueness of CSD representation, the requirement that there be no adjacent is and three is maximum in the generated CSD value is provided as a generation constraint. The example value then becomes in CSD format:
[1 0 −1 0 0 1 0 0], which satisfies the criteria of having only three non-zero values, and no adjacent ±1 values. In step 1608, the CSD is separated into three non-overlapping values, with the requirement that no more than a single non-zero digit be present in each 4 bit grouping 1622, 1624, or 1626. Each value is then encoded into a Zero/Sign/Shift format as shown in step 1610, which for the present example generates CSD0= [0111], indicating non-zero, positive sign, and three left shift operations. The use of this notation allows the ZSS value to be provided to the filter engine of FIG. 11D, which accordingly generates an output 1187 representing the shifted, signed, or zeroed value. It can also be seen that CSD0 1622 of FIG. 16, when provided to filter processor 1128 of FIG. 11B, generates h11 multiplied by a coefficient (through sign and shift operations) which is directly added in summer 1136, CSD1 1624 of FIG. 16 is shifted left twice 1135 and summed 1136 of FIG. 11B, and CSD2 1626 of FIG. 16 is similarly multiplied by coefficient in ZSS format, which is shifted left 4 times 1134 and summed 1136 of FIG. 11B. In this manner, the operation of the coefficients in ZSS format are efficiently stored, requiring only 12 bits per ZSS coefficient to synthesize the operations required for each filter coefficient.

An FIR filter can be described as:

$$Z(n) = \sum_{K=-\frac{M}{2}+1}^{\frac{M}{2}-1} p(k)q(n-k)$$

In one embodiment of the present invention, the number of coefficients in the FIR filter is chosen to be 13 taps. When implemented using tapped delay lines as shown in FIG. 7, this requires 13 registers, 13 multipliers and 14 adders. The latency is determined by the number of filter taps.

Figure 17:
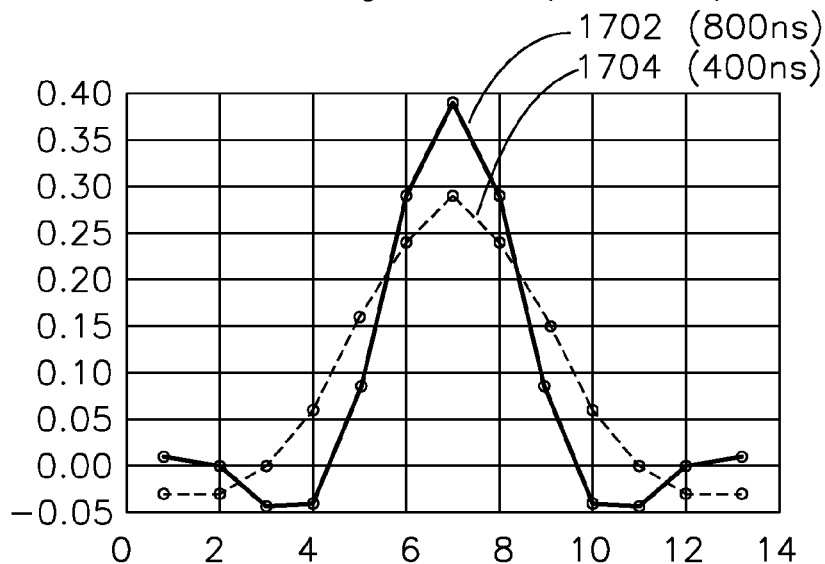
FIG. 17 shows the plot of a channel smoothing filter impulse response.
Figure 18:
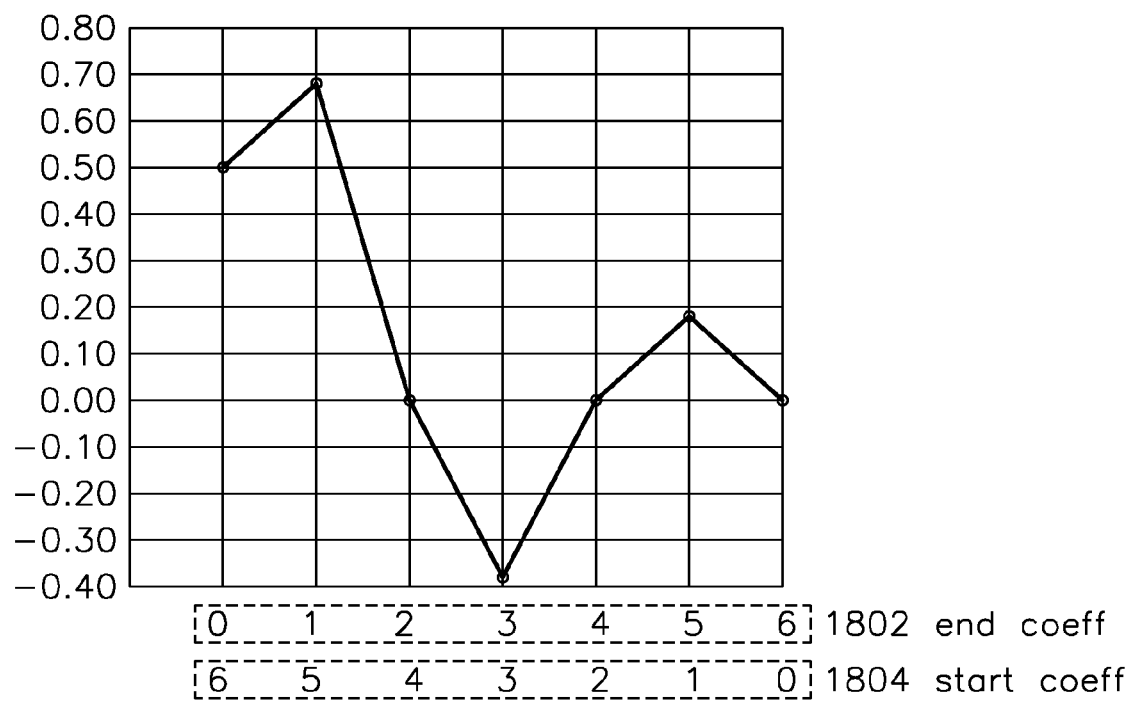
FIG. 18 shows the plot of an edge smoothing filter impulse response.

FIG. 17 shows the coefficients (and impulse response) of a channel smoothing filter for use in the present invention, which may be used with a W1(t) function 404 as shown in FIG. 4E. Filter response 1702 shows the filter coefficients (shown as discrete circles) for a filter suitable for use in a multi-path channel having an 800 ns response time, and response 1704 shows the filter coefficients for a filter suitable for a channel with less multi-path reflections, such as having a 400 ns response time. One difficulty of using a filter such as one shown in FIG. 17 is the problem of operating on truncated arrays of data, such as subcarrier data which tends to generate spurious responses at the opposite edges of the filtered data. This may be addressed by switching to an edge filter characteristic shown in FIG. 18, such that the first 8 samples are generated using sample 0 through sample 7 applied to an FIR implemented in FIGS. 11A, 11B, 11C, 11D using the coefficients of FIG. 18, thereafter switching to central filtering of FIG. 17 after these 8 edge subcarrier values, and switching back to the edge filter of FIG. 18 for the final 8 edge subcarriers. In one embodiment of the invention, the channel smoothing is performed by two filters: one 13 tap filter with the coefficients shown in one of the characteristics shown in FIG. 17 to smooth center sub-carriers inside the edges, and the 7 tap filter shown in FIG. 18 to smooth edge sub-carriers. A dedicated controller such as 1002 of FIG. 10 can provide synchronization between the edge filter and central filter coefficient selection, as well as provide the FFT addressing offset which creates the even function required by the single channel filter. The selection of which of the FIG. 17 central filters 1702 or 1704 may be made based on the channel characteristic time response, and the ability to easily switch filters on a packet by packet basis by simply changing ZSS filter coefficients is one of the advantages of the present invention.

Figure 19:
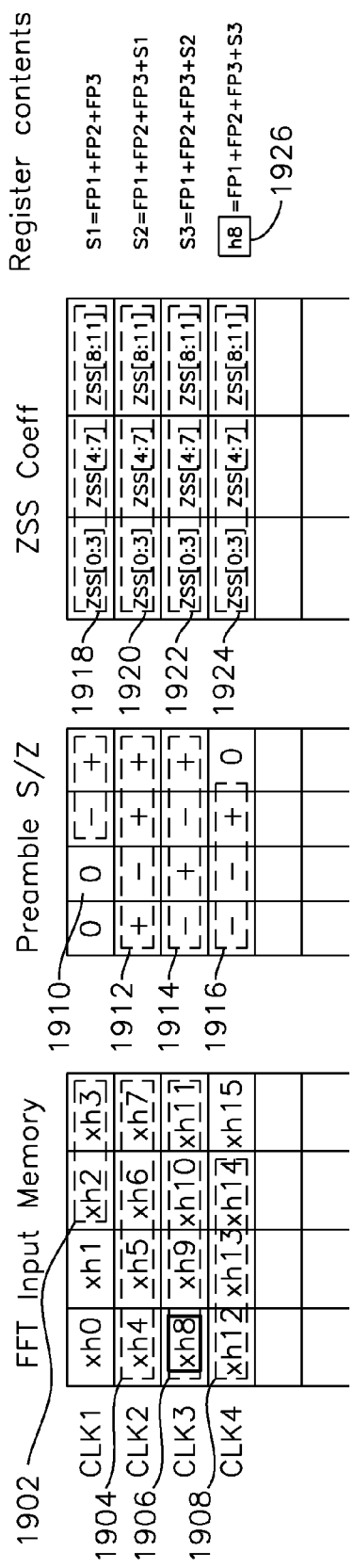
FIG. 19 shows an example calculation of a smoothed h8 sample on successive clock cycles.
Figure 20:
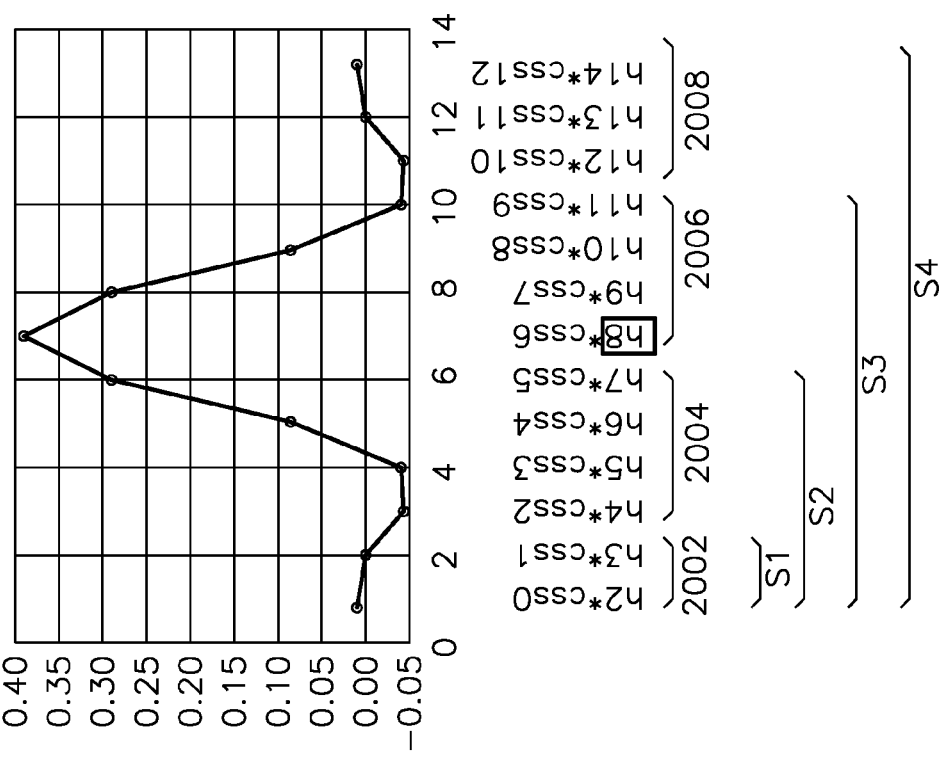
FIG. 20 shows the calculation of smoothed h8 of FIG. 19.
Figure 21:
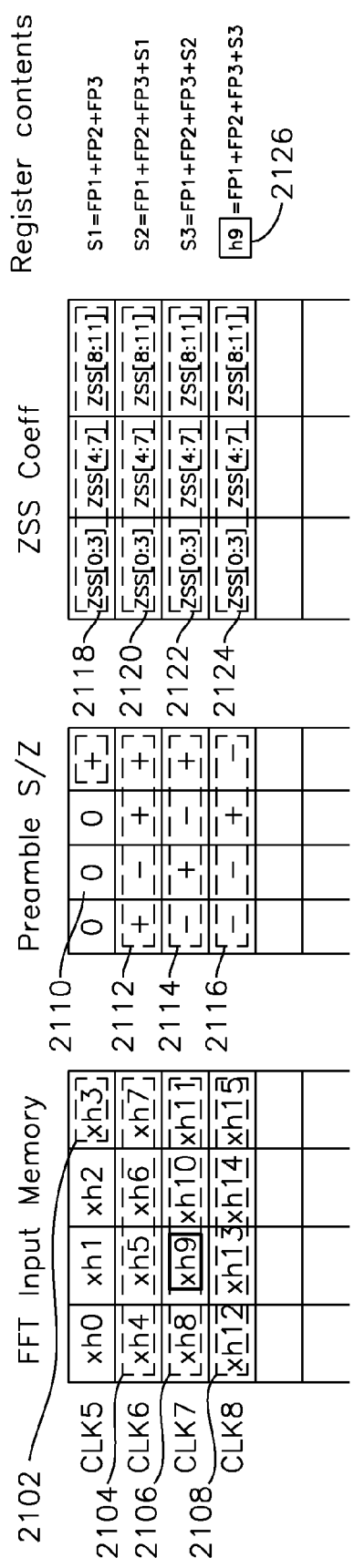
FIG. 21 shows an example calculation of a smoothed h9 sample on successive clock cycles following the calculation of smoothed h8.
Figure 22:
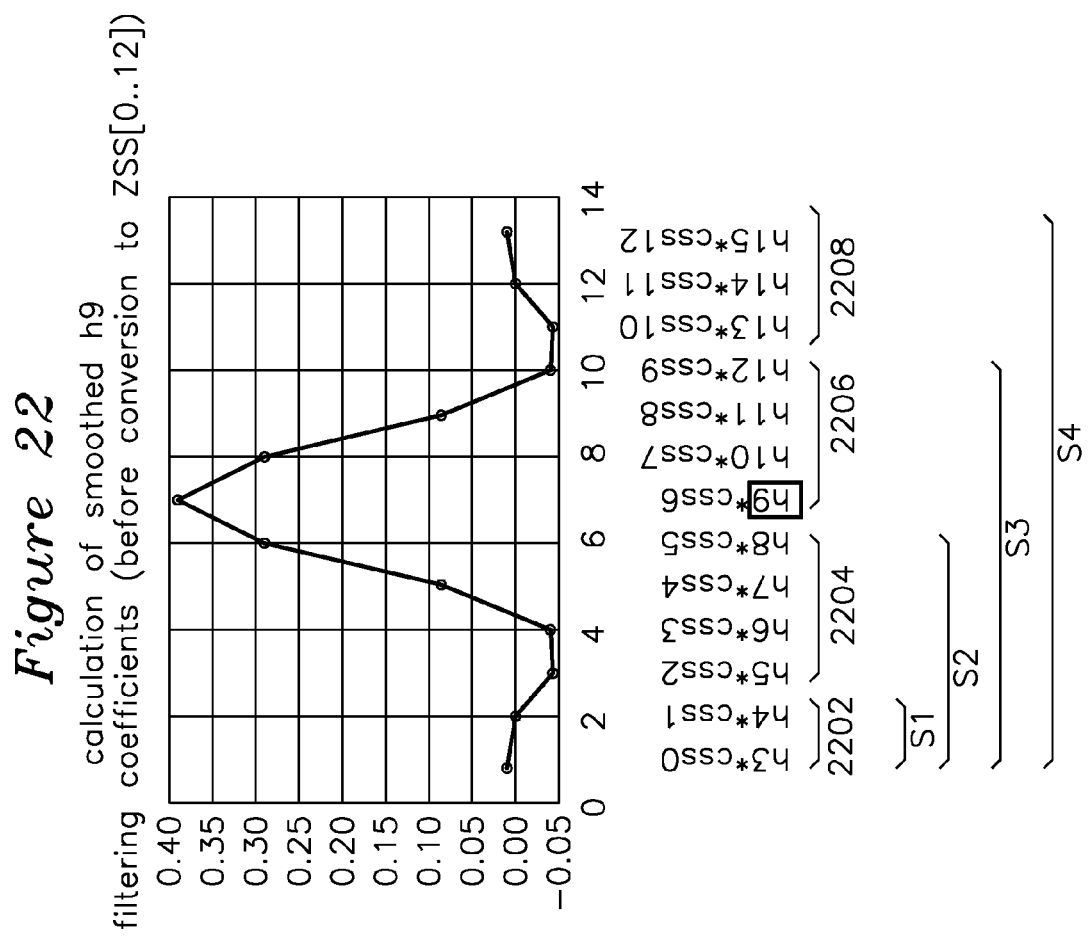
FIG. 22 shows the calculation of smoothed h9 of FIG. 21.

FIGS. 19 and 20 show the overall clocking steps for an example calculation for a smoothed h8 and FIGS. 21 and 22 show the same calculation for a smoothed h9, for the example architecture shown in FIGS. 11A, 11B, 11C, and 11D. FFT input memory provides a series of values to be smoothed, and the smoothing function is a 13 point FIR filter, so 13 points are used at a time, with the calculation for a single smoothed value such as smoothed h8 performed over four clock cycles. The particular 13 points are selected using the preamble equalizer such as the four H11 H_eq of FIG. 11A. Each H_eq preamble equalizer function accepts a sign bit for values within the domain of computation, and a zero value for values outside the calculation. In this manner, the preamble equalizer output generates the 13 values (h2 . . . h14) used in the calculation, such as by multiplying 1902 with 1910, 1906 with 1912, 1908 with 1912, and 1908 with 1916, each on one of four successive clock cycles, respectively. The FIG. 21 ZSS coefficients 1918, 1920, 1922, 1924 for each of the four clock cycle of the calculation are selected as described in FIG. 16 and used as described in FIG. 11B, and the shifted 1134 output of first filter processor 1126 is shown as FP1, the shifted 1135 output of second filter processor 1127 is shown as FP2, and the output of third filter processor 1128 is shown as FP3, with the register 1137 saving the sum FP1+FP2+FP3 of the previous calculation. FIG. 20 shows how the computation is performed for each clock cycle using the more familiar CSS coefficients, which result is realized in FIG. 11B using the improved storage efficiency of ZSS coefficients. The register contents for each clock cycle are also shown in FIG. 19, with the register cleared of previous contents, and summing FP1+FP2+FP3 (from the equivalent of css0*h2+css1*h3 also shown as 2002 of FIG. 20) to form S1 on a first cycle, then forming S2 by summing S1 with FP1+FP2+FP3 (from the equivalent of css2*h4+css3*h5+css4*h6+css5*h7 also shown as 2004 of FIG. 20) on the second cycle, then forming S3 by summing FP1+FP2+FP3 (from the equivalent of css6*h8+css7*h9+css8*h10+css9*h11 also shown as 2006 in FIG. 20) on the third cycle, then forming S4 by summing S3 with FP1+FP2+FP3 (from the equivalent of css10*h12+css11*h13+css12*h14 also shown as 2008 in FIG. 20) on the fourth cycle, resulting in the smoothed h8 value 1926 of FIG. 19. Although the calculation is done in FIG. 11B using equivalent ZSS rather than CSS shown in FIG. 20, it becomes clear that each clock cycle calculation FP1+FP2+FP3 generates the same contribution value whether in CSS of ZSS for the smoothed value, and in the present example architecture, this calculation is performed in four successive clock cycles, resulting in the actualization of an FIR filter using significantly fewer components, and only adders rather than multipliers, with no loss of accuracy or resolution.

FIGS. 21 and 22 show the same smoothing calculation as was performed for FIGS. 19 and 20, for the subsequently smoothed value h9, which is done using subsequent clock cycle 5 through 8, performing similar smoothing operations over a different preamble equalization window and ZSS coefficients, as can be seen from FIG. 21. The examples shown in FIGS. 19 through 22 are for the central filter derived from FIG. 17, and are shown for clarity. As described earlier, the smoothing of a sequence such as [h0 . . . h128] requires the filtering sequence start and end with an edge filter, after which the filtering transitions to the central filter of FIG. 17. The smoothing filter described in FIGS. 19 and 20 operates at the start of the data sequence using start coefficients ZSS derived from the CSS coefficients for the index 1804 shown in FIG. 18 (with h values less than index 0 set to 0), then switching to the central filter ZSS coefficients when a sufficient number of valid h values are present to fully populate the FIR filter, shown in the present example as index 6, where the filter coefficients may switch from edge filter of FIG. 18 using index 1804 to the symmetric central filter of FIG. 17. Similarly, at the end of the h sequence, the last 6 smoothing filter ZSS coefficients used are selected from the indexes 1802 for the end filter sequence, with the remaining h values outside the range set to 0, as is known in the field of filtering of finite sequences.

Table 1 below shows the organization of the FFT outputs for use with 20 Mhz system clock operation with 64 subcarriers, and table 2 shows the organization of the FFT outputs for use with 40 Mhz system clock operation with 128 subcarriers. The example organizations of data optimize the memory required compared to storing the outputs in single ram serially. If the outputs are stored serially in a single Ram to perform the filtering of one sub-carrier requires 13 multipliers and 13 fetches require to smooth single sub-carrier.

In one example embodiment, the FFT outputs are stored in 4 memories so that 4 sub-carriers at a time are retrieved for use with the preamble equalizer and channel smoothing filter. In this example, 4 clock cycles are required to fetch the 16 sub-carriers to smooth one sub-carriers. As a pipelined architecture, the smoothing filter of FIGS. 11A, 11B, 11C, and 11D provides one smoothed sub-carrier for each system clock cycle.

In one embodiment of the invention, the filter coefficients are modified for a long (multi-path) channel response compared to shorter channel response. In this manner, it is possible to control the smoothing filter to adapt for the case where the receiver guard interval (GI) is halved in a receive mode known as "Half-GI", and dynamically controlling the smoothing filter window by computing the channel profile and applying the resulting profile to the smoothing filter as previously described. The smoothing filter is controlled in this example by changing the coefficients so that amount of smoothing can be vary in different channel conditions by varying smoothing filter length.

TABLE 1

20 Mhz RAM coefficients

| FFT address | RAM 1 | RAM 2 | RAM 3 | RAM 4 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | −32 | −31 | −30 | −29 |
| 9 | −28 | −27 | −26 | −25 |
| 10 | −24 | −23 | −22 | −21 |
| 11 | −20 | −19 | −18 | −17 |
| 12 | −16 | −15 | −14 | −13 |
| 13 | −12 | −11 | −10 | −9 |
| 14 | −8 | −7 | −6 | −5 |
| 15 | −4 | −3 | −2 | −1 |

TABLE 2

40 Mhz RAM coefficients

| FFT address | RAM 1 | RAM 2 | RAM 3 | RAM 4 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |

TABLE 2-continued

40 Mhz RAM coefficients

| FFT address | RAM 1 | RAM 2 | RAM 3 | RAM 4 |
|---|---|---|---|---|
| 14 | 56 | 57 | 58 | 59 |
| 15 | 60 | 61 | 62 | 63 |
| 16 | −64 | −63 | −62 | −61 |
| 17 | −60 | −59 | −58 | −57 |
| 18 | −56 | −55 | −54 | −53 |
| 19 | −52 | −51 | −50 | −49 |
| 20 | −48 | −47 | −46 | −45 |
| 21 | −44 | −43 | −42 | −41 |
| 22 | −40 | −39 | −38 | −37 |
| 23 | −36 | −35 | −34 | −33 |
| 24 | −32 | −31 | −30 | −29 |
| 25 | −28 | −27 | −26 | −25 |
| 26 | −24 | −23 | −22 | −21 |
| 27 | −20 | −19 | −18 | −17 |
| 28 | −16 | −15 | −14 | −13 |
| 29 | −12 | −11 | −10 | −9 |
| 30 | −8 | −7 | −6 | −5 |
| 31 | −4 | −3 | −2 | −1 |

We claim:

1. A channel smoothing filter having:
a controller;
a plurality of preamble equalizers;
an FFT memory addressed by said controller, said FFT memory providing values X*H as parallel data applied to a unique one of each said preamble equalizers;
each said preamble equalizer also coupled to a preamble zero generator and a preamble sign generator, said preamble zero generator causing the output of said preamble equalizer to be zero, said preamble sign generator causing said preamble equalizer output to be either the input value applied to said preamble equalizer input or the two's compliment of the input value applied to said preamble equalizer;
a channel smoothing filter having a first filter processor, a second filter processor, and a third filter processor, each said filter processor having a filter engine coupled to each said preamble equalizer output, each said filter engine also accepting a filter coefficient whereby no more than one of each said filter engines in each said filter processor is active, said filter processor output formed by selecting the said no more than one filter engine which is active, said channel smoothing filter also having:
a register clocked by a system clock;
a summer having an output coupled to said register, said summer having inputs coupled to:
said first filter processor through a first shifter;
said second filter processor through a second shifter;
said third filter processor;
said register output;
whereby said filter engine coefficients coupled to said first filter processor, said second filter processor, and said third filter processor provide edge filtering coefficients during an edge interval followed by central filtering coefficients during a central interval, followed by edge filtering coefficients during an edge interval;
where said controller addresses said FFT memory to cause an even function to be produced.

2. The channel smoothing filter of claim 1 where said controller addresses said FFT memory such that among a plurality of FFT memory samples having an energy level, a first sample to be output by said FFT memory is substantially a central sample within said plurality of samples having an energy level.

3. The channel smoothing filter of claim 1 where said controller generates the FFT addressing, the zero and sign inputs used by said preamble equalizer, and the coefficients used by said filter engines.

4. The channel smoothing filter of claim 1 where said filter engine coefficients contain at least zero bit, sign bit, and shift bits.

5. The channel smoothing filter of claim 1 where said filter engine coefficients are generated from canonical signed digit coefficients.

6. The channel smoothing filter of claim 1 where said preamble equalizer includes a first multiplexer responsive to said preamble sign and selecting either an X*H input or the 2's compliment of said X*H input, said first multiplexer having an output coupled to a second multiplexer responsive to said preamble zero input, said second multiplexer generating said preamble equalizer output by selecting either said first multiplexer output or a zero output.

7. The channel smoothing filter of claim 1 where said filter engine has a first multiplexer responsive to a shift input and generating an output which is said filter engine input shifted by zero, one, two, or three digits, said first multiplexer coupled to a second multiplexer generating said filter engine output by selecting either said first multiplexer output, a 2's compliment of said first multiplexer output, or zero.

8. A channel smoothing filter accepting a plurality of samples as an input and producing a smoothed output value after c clock cycles, the smoothing filter accepting substantially simultaneously m samples of said plurality of samples during each said clock cycle;
said m samples during each said clock cycle also accompanied by a plurality k of coefficients;
each said coefficient indicating a zero value, a sign value, and a shift value;
said m samples provided to a plurality of filter processors, each said filter processor accepting a unique subset of said k coefficients, each said filter processor generating an output coupled to a shifter generating an output by shifting said filter processor output a power of two number of times;
the output of each said shifter coupled to an adder having an output, the adder also having an input coupled to a register output;
said register having an input for storing said adder output, said register transferring said register input to said register output on each said clock cycle;
where said plurality of filter processors is three and a first said filter processor is coupled to a said shifter performing a left shift of four bits; a second said filter processor is coupled to a said shifter performing a left shift of two bits, and a third said filter processor is coupled directly to said adder input.

9. The channel smoothing filter of claim 8 where each said filter processor includes a summer coupled to m filter engines, each said filter engine accepting one of said m input values and also a unique said coefficient.

10. The channel smoothing filter of claim 8 where said coefficient is a ZSS coefficient.

11. The channel smoothing filter of claim 8 where said coefficients provide an edge filter characteristic for a first range of said samples, a central filter characteristic for a second range of said samples, and an edge filter characteristic for a final range of said samples.

12. The channel smoothing filter of claim 8 where said samples are offset such that an equal number of samples having signal energy over a range of said samples are offset to substantially a median point over said range.

13. The channel smoothing filter of claim 8 where Nsc samples to be filtered include a subset series of samples from 0 to Nsignal which have signal energy above a threshold, and said samples are provided to said smoothing filter starting at an Nsignal/2 sample through said Nsc sample followed by said 0 sample through an Nsc−1 sample.

14. The channel smoothing filter of claim 8 where said samples are provided by a first FFT input memory containing a first channel response added to a different channel response and a second FFT input memory containing said different channel response subtracted from said first channel response, said first FFT input memory and said second FFT input memory added together and provided to a preamble equalizer to generate said stream of samples.

15. The channel smoothing filter of claim 14 where said preamble equalizer includes a function for gating the number of applied samples over said c clock cycles to substantially equal the number of said filter coefficients.

16. The channel smoothing filter of claim 8 where said filter coefficients depend on the channel response as determined by the number Nsignal of samples which contain signal energy.

17. The channel smoothing filter of claim 16 where said filter coefficients provide a narrower impulse response when said Nsignal is greater than a threshold and a wider impulse response when said Nsignal is less than a threshold.

* * * * *